US012625297B2

(12) United States Patent
Abubakar et al.

(10) Patent No.: US 12,625,297 B2
(45) Date of Patent: May 12, 2026

(54) AUTOMATIC SUBSURFACE PROPERTY MODEL BUILDING AND VALIDATION

(71) Applicant: Schlumberger Technology Corporation, Sugar Land, TX (US)

(72) Inventors: Aria Abubakar, Sugar Land, TX (US); Haibin Di, Houston, TX (US); Tao Zhao, Katy, TX (US); Zhun Li, Houston, TX (US); Cen Li, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 383 days.

(21) Appl. No.: 18/552,072

(22) PCT Filed: Mar. 22, 2022

(86) PCT No.: PCT/US2022/071266
§ 371 (c)(1),
(2) Date: Sep. 22, 2023

(87) PCT Pub. No.: WO2022/204682
PCT Pub. Date: Sep. 29, 2022

(65) Prior Publication Data
US 2024/0168194 A1     May 23, 2024

Related U.S. Application Data

(60) Provisional application No. 63/164,259, filed on Mar. 22, 2021.

(51) Int. Cl.
*G01V 20/00* (2024.01)
*E21B 49/00* (2006.01)
*G06N 20/00* (2019.01)

(52) U.S. Cl.
CPC .............. *G01V 20/00* (2024.01); *E21B 49/00* (2013.01); *G06N 20/00* (2019.01); *E21B 2200/20* (2020.05)

(58) Field of Classification Search
CPC .......... G01V 20/00; G01V 1/28; G01V 1/306; G01V 2210/66; G06N 20/20; E21B 49/00; E21B 2200/20
(Continued)

(56) References Cited

U.S. PATENT DOCUMENTS

2011/0155389 A1* 6/2011 Burtz ..................... G01V 99/00
166/369
2019/0064378 A1 2/2019 Liu et al.
(Continued)

FOREIGN PATENT DOCUMENTS

WO      WO-2019055565 A1 *  3/2019  ............. G01V 99/00
WO          2020243216 A1   12/2020

OTHER PUBLICATIONS

Search Report and Written Opinion of International Patent Application No. PCT/US2022/071266, dated Jun. 21, 2022, 11 Pages.
(Continued)

*Primary Examiner* — Michael P Nghiem
(74) *Attorney, Agent, or Firm* — Kyle R. Miiller

(57) ABSTRACT

A method for modeling a subsurface property for a subterranean volume of interest includes receiving input measurement data representing a subterranean volume of interest, predicting a subsurface property based at least in part on the input measurement data using a first machine learning model, predicting a subsurface property model based at least in part on the subsurface property, the input measurement data, or both, using a second machine learning model, predicting synthetic measurement data based at least in part on the subsurface property model using a third machine (Continued)

learning model, a physics-based model, or both, comparing the synthetic measurement data and the input measurement data, and training the first machine learning model, the second machine learning model, or both based at least in part on the comparing.

18 Claims, 8 Drawing Sheets

(58) Field of Classification Search
USPC .......................................................... 702/6
See application file for complete search history.

(56) References Cited

U.S. PATENT DOCUMENTS

| | | | | |
|---|---|---|---|---|
| 2020/0332627 | A1* | 10/2020 | Tang | E21B 44/00 |
| 2021/0027426 | A1* | 1/2021 | Ma | G06T 3/4053 |
| 2023/0026857 | A1* | 1/2023 | Di | G01V 1/345 |

OTHER PUBLICATIONS

Alfarraj, M., et al., 'Semi-supervised Sequence Modeling for Elastic Impedance Inversion', arXiv:1908.07849v1, Aug. 19, 2019, 14 Pages.
Guo, R., et al., 'Application of Supervised Descent Method for Transient EM Data Inversion', 2018 SEG International Exposition and Annual Meeting, OnePetro, Aug. 2018, 4 Pages.
Di, H., et al., 'Accelerating Seismic Fault and Stratigraphy Interpretation With Deep CNNs: ACase Study of the Taranaki Basin, New Zealand', 2020, The Leading Edge, Oct. 2020, pp. 727-733, vol. 39, No. 10.
Di, H., et al., 'Seismic Stratigraphy Interpretation by Deep Convolutional Neural Networks: A Semisupervised Workflow', Geophysics, 2020, pp. WA77-WA86, vol. 85, No. 4.
Huang, L., et al., 'A Scalable Deep Learning Platform for Identifying Geologic Features From Seismic Attributes', The Leading Edge, 2017, 32 Pages, vol. 36, No. 3.
Tao, C., et al., 'Remote Sensing Image Scene Classification with Self-Supervised Paradigm under Limited Labeled Samples', arXiv:2010.00882v1, Oct. 2, 2020, pp. 1-6.
Hu, W., et al., 'Physics-Guided Self-Supervised Learning for Low Frequency Data Prediction in FWI', SEG Technical Program Expanded Abstracts 2020, Society of Exploration Geophysicists, pp. 875-879.
Fu, H., et al., 'Seismic Waveform Inversion Using a Neural Network-Based Forward', Journal of Physics: Conference Series, 2019, pp. 1-7, vol. 1324, No. 1.
Wang, Y., et al., 'Well-Logging Constrained Seismic Inversion Based on Closed-Loop Convolutional Neural Network', IEEE Transactions on Geoscience and Remote Sensing, 2020, pp. 5564-5574, vol. 58, No. 8.
Search Report of European Application No. 22776824.9 dated Jan. 8, 2025, 10 Pages.
Wang, Y.Q. et al., "Seismic Impedance Inversion Based on Cycle-consistent Generative Adversarial Network", SEG International Exposition and 89th Annual Meeting, pp. 2498-2502, 2019, SEG.
Di, H et al., "Semi-Supervised Seismic and Well Log Integration for Reservoir Property Estimation", SEG International Exposition and 90th Annual Meeting, pp. 2166-2170, 2019, SEG.

* cited by examiner

AUTOMATIC SUBSURFACE PROPERTY MODEL BUILDING AND VALIDATION

CROSS-REFERENCE TO RELATED APPLICATIONS

This application is a National Stage Entry of International Application No. PCT/US2022/071266, filed Mar. 22, 2022, which claims priority to U.S. Provisional Patent Application No. 63/164,259 which was filed on Mar. 22, 2021 and is incorporated herein by reference in its entirety.

BACKGROUND

Measurements are collected in oilfield and other contexts that can be used to calculate or "invert" various properties of a subterranean volume of interest. Various processing and modeling techniques are employed to perform such inversion. Generally, the inversion process relies on a combination of several different such processing and/or modeling techniques, with human intervention called for along the way. For example, subject matter experts may receive the data generated at one stage and interpret the data, e.g., labeling stratigraphies or structures/volumes of interests, etc., before passing the data to the next stage.

The inclusion of such human-based efforts, as well as the disjointed nature of the process, may make the process time intensive, prone to errors, and expensive.

SUMMARY

Embodiments of the disclosure include a method for modeling a subsurface property for a subterranean volume of interest. The method includes receiving input measurement data representing the subterranean volume of interest, predicting a subsurface property based at least in part on the input measurement data using a first machine learning model, predicting a subsurface property model based at least in part on the subsurface property, the input measurement data, or both, using a second machine learning model, predicting synthetic measurement data based at least in part on the subsurface property model using a third machine learning model, a physics-based model, or both, comparing the synthetic measurement data and the input measurement data, and training the first machine learning model, the second machine learning model, or both based at least in part on the comparing.

In an embodiment, training the first machine learning model, the second machine learning model, or both includes generating a training gradient using a fourth machine learning model.

In an embodiment, the input measurement data includes a well log, seismic data, or both.

In an embodiment, the method further includes processing the input measurement data using a machine learning model, a physics-based model, or both prior to predicting the subsurface property based at least in part on the input measurement data.

In an embodiment, the subsurface property is selected from the group consisting of: resistivity, density, one or more seismic attributes, relative geological time, fault location, sale body location, and stratigraphy.

In an embodiment, the subsurface property model includes a three-dimensional model of a property of the subterranean volume of interest, and the property is selected from the group consisting of density, sonic wave velocity, acoustic impedance, porosity, and saturation.

In an embodiment, training the first machine learning model, the second machine learning model, or both includes holding the first machine learning model constant while adjusting the second machine learning model based on a comparison between the synthetic measurement data and the input measurement data, and holding the second machine learning model constant while adjusting the first machine learning model based on a comparison between the synthetic measurement data and the input measurement data.

In an embodiment, predicting the subsurface property based at least in part on the input measurement data using a first machine learning model, includes combining seismic traces with noise, training a self-supervised learning model, including a SSL encoder and a SSL decoder, to reconstruct the seismic traces from the combination of the seismic traces and noise, training a supervised learning model, including the SSL decoder of the trained self-supervised learning model, and a SL encoder, to predict one or more properties based on seismic traces, and predicting the subsurface property using the supervised learning model.

Embodiments of the disclosure further include a computing system including one or more processors and a memory system including one or more non-transitory computer-readable media storing instructions that, when executed by at least one of the one or more processors, cause the computing system to perform operations. The operations include receiving input measurement data representing a subterranean volume of interest, predicting a subsurface property based at least in part on the input measurement data using a first machine learning model, predicting a subsurface property model based at least in part on the subsurface property, the input measurement data, or both, using a second machine learning model, predicting synthetic measurement data based at least in part on the subsurface property model using a third machine learning model, a physics-based model, or both, comparing the synthetic measurement data and the input measurement data, and training the first machine learning model, the second machine learning model, or both based at least in part on the comparing.

Embodiments of the disclosure also include a non-transitory computer-readable medium storing instructions that, when executed by at least one processor of a computing system, cause the computing system to perform operations. The operations include receiving input measurement data representing a subterranean volume of interest, predicting a subsurface property based at least in part on the input measurement data using a first machine learning model, predicting a subsurface property model based at least in part on the subsurface property, the input measurement data, or both, using a second machine learning model, predicting synthetic measurement data based at least in part on the subsurface property model using a third machine learning model, a physics-based model, or both, comparing the synthetic measurement data and the input measurement data, and training the first machine learning model, the second machine learning model, or both based at least in part on the comparing.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

Figures 1A, 1B:
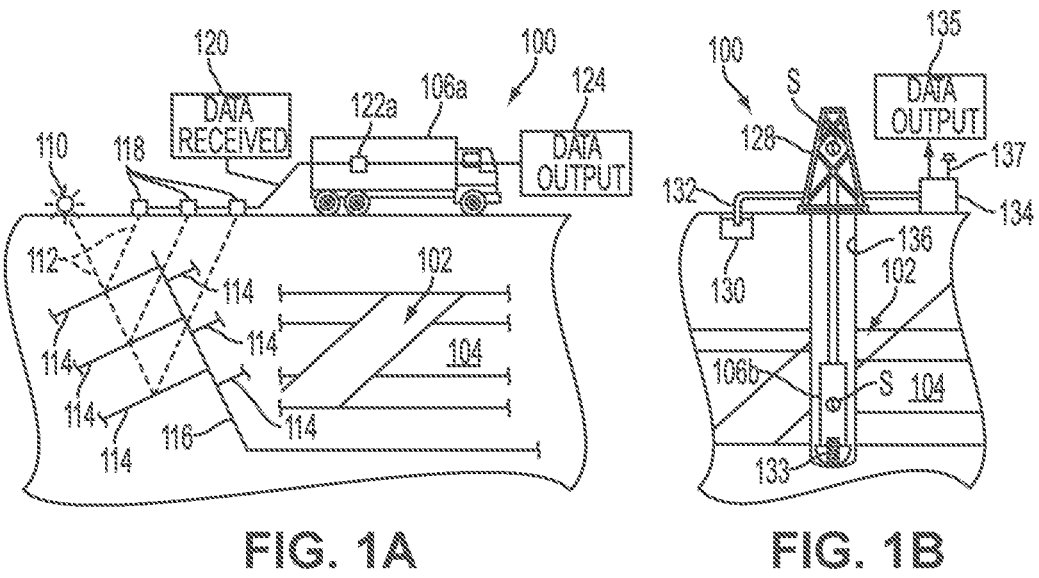
FIGS. 1A, 1B, 1C, 1D, 2, 3A, and 3B illustrate simplified, schematic views of an oilfield and its operation, according to an embodiment.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

Figures 1C, 1D:
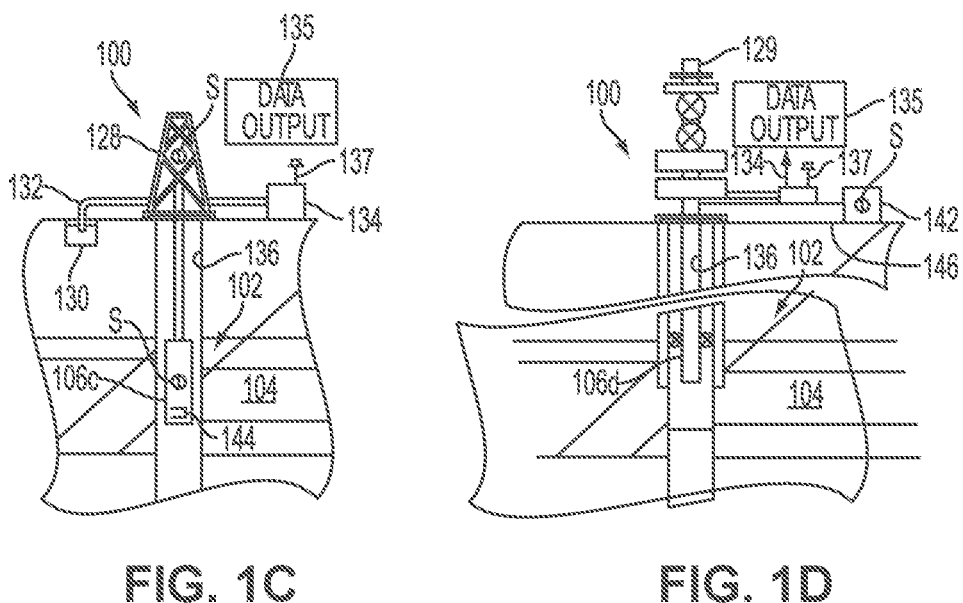

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

Figure 2:
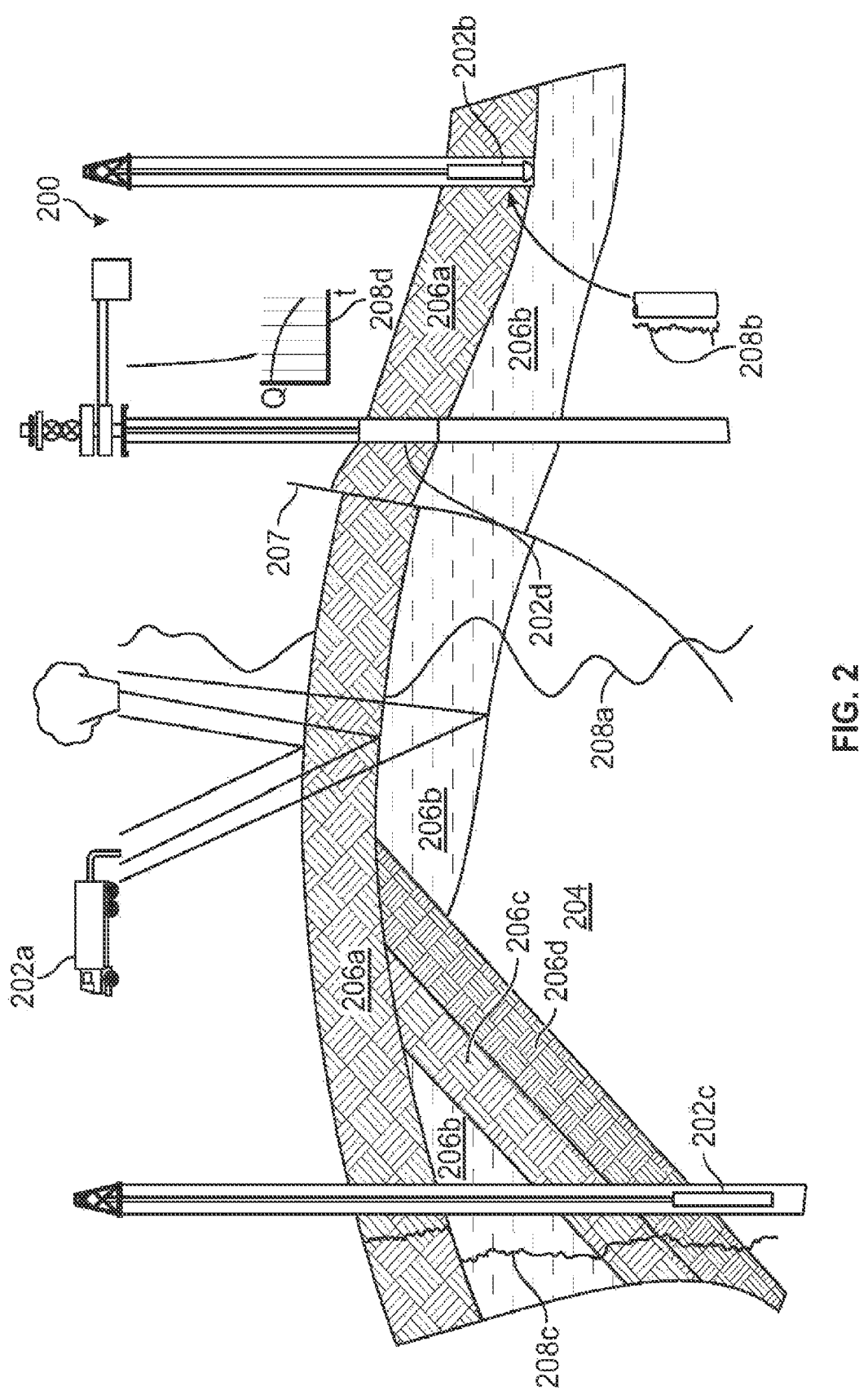

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
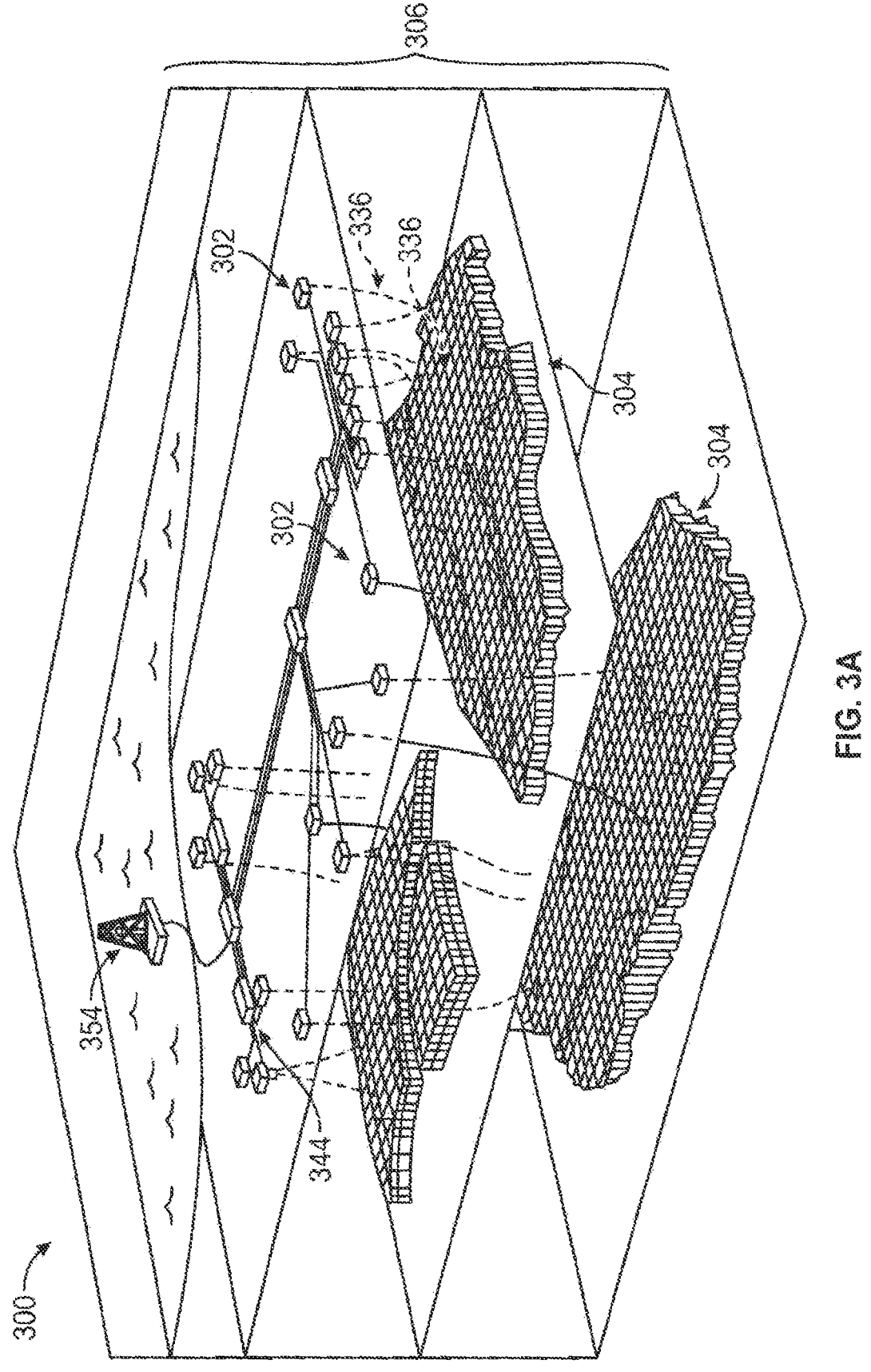

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the Earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
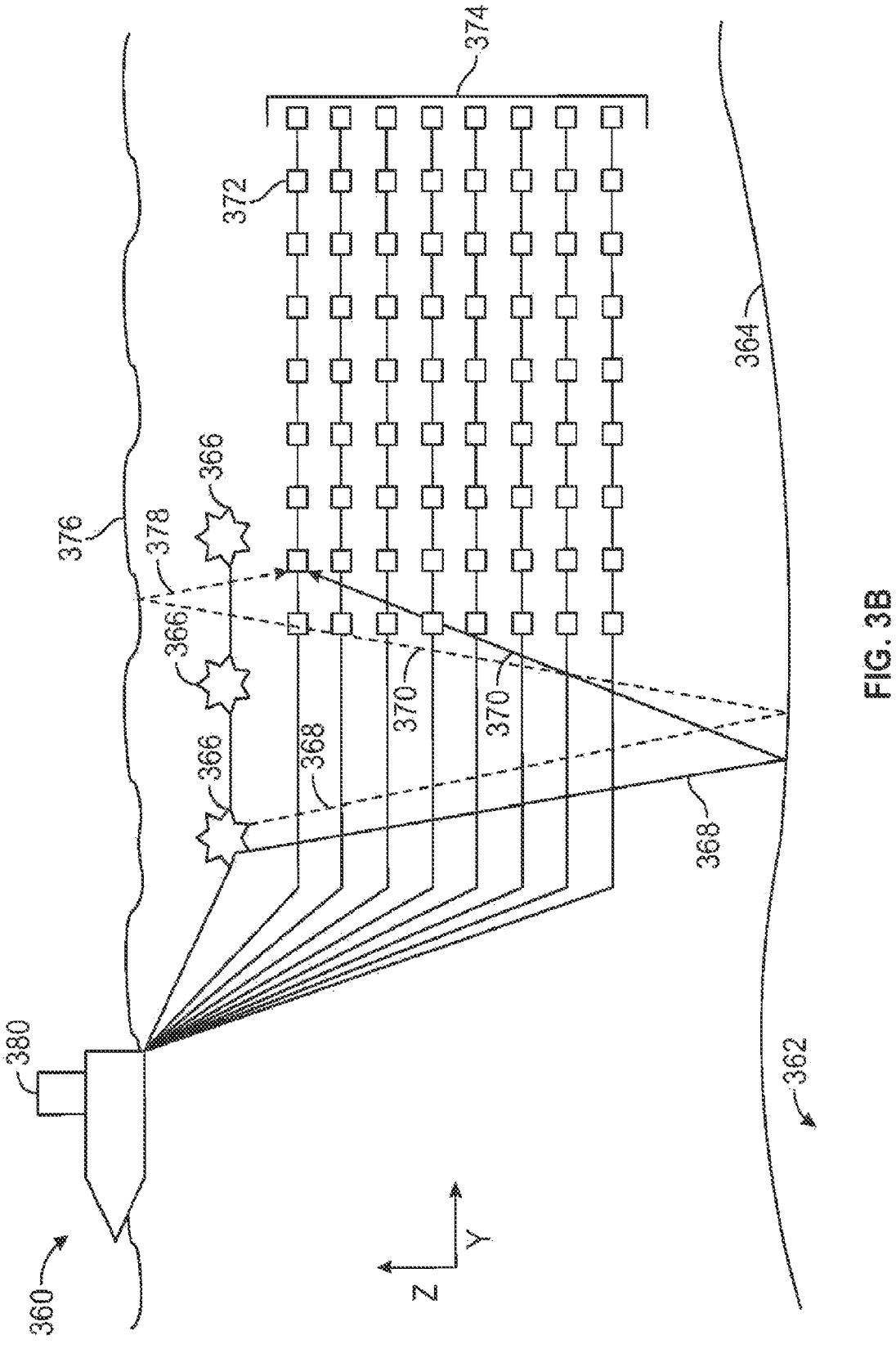

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4:
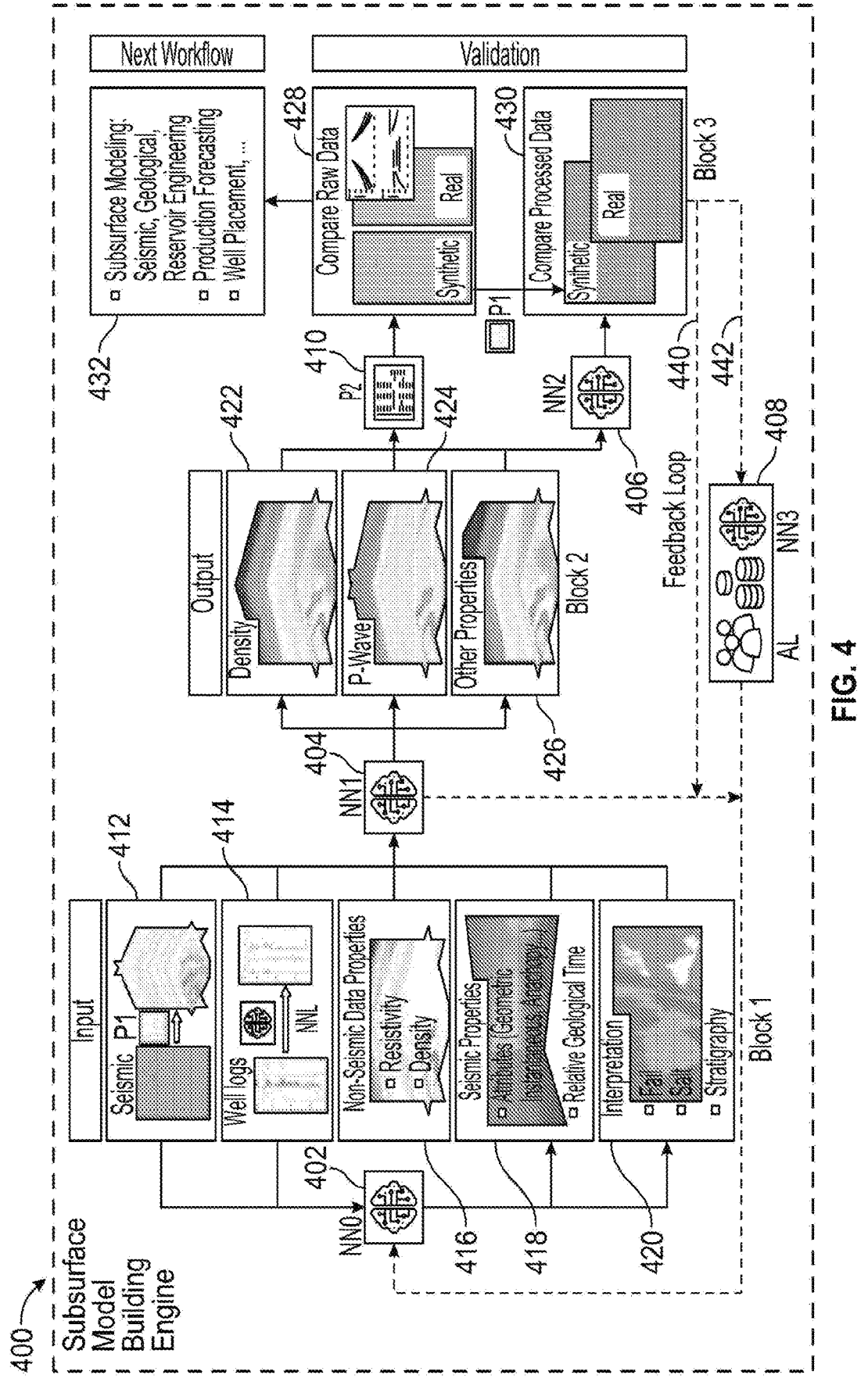
FIG. 4 illustrates a diagram of a system for automatically building and validating geophysical models from measurement data, according to an embodiment.

FIG. 4 illustrates a diagram of a system 400 for automatically interpreting subsurface data, e.g., using machine learning models and/or other artificial intelligence, in order to generate subsurface models more efficiently and accurately, according to an embodiment. As described in greater detail below, the system 400 may include one or more processors that are configured to execute instructions stored in a memory system, which cause the system 400 to perform operations. In the illustrated embodiment, the system 400 includes a first machine learning model 402, a second machine learning model 404, a third machine learning model 406, a fourth machine learning model 408, and a physics-based, deterministic model 410. The machine learning models 402-408 and the physics-based model 410 may be provided as software or hardware on a physical or virtual computing device, and may be trained to perform one or more processing tasks. In particular, the machine learning models 402-408 (e.g., neural networks) may be trained to receive a certain type of input and predict an output based thereon. The physics-based model 410 may employ physics, e.g., equations of state, and thus may be simulated in order to render a deterministic solution for a physical system, based on certain input conditions.

As will be described in greater detail below, the system 400 may receive various sources of input. For example, the system 400 may include seismic data 412, various types of well logs 414, non-seismic data or properties 416. The first machine learning model 402 may operate using these inputs and produce, for example, seismic properties (e.g., attributes) 418, and interpretations 420.

As will also be described in greater detail below, the second machine learning model 404 may produce output, based at least in part on the output of the first machine learning model 402 and the inputs. The output of the second machine learning model 404 may include subsurface property models of density 422, P-wave velocity 424, and/or other properties 426 (e.g., sonic acoustic impedance, porosity, saturation, and the like).

Further, the physics-based model 410 and the third machine learning model 406 may both be configured to generate "synthetic" measurement data 428, 430, respectively, based on the subsurface property models 422-426. Further, as represented at block 432, the system 400 may provide various models and properties for external processing.

To support operation and continued training of the machine learning models 402, 404, 406, 408 during the operation of the system 400, the system 400 may also implement one or more feedback loops (two shown: 440, 442). A fourth machine learning model 410 may be implemented to support operation of one or both of the feedback loops 440, 442. The operation of the feedback loops 440, 442, according to an embodiment, is described in greater detail below.

Figure 5:
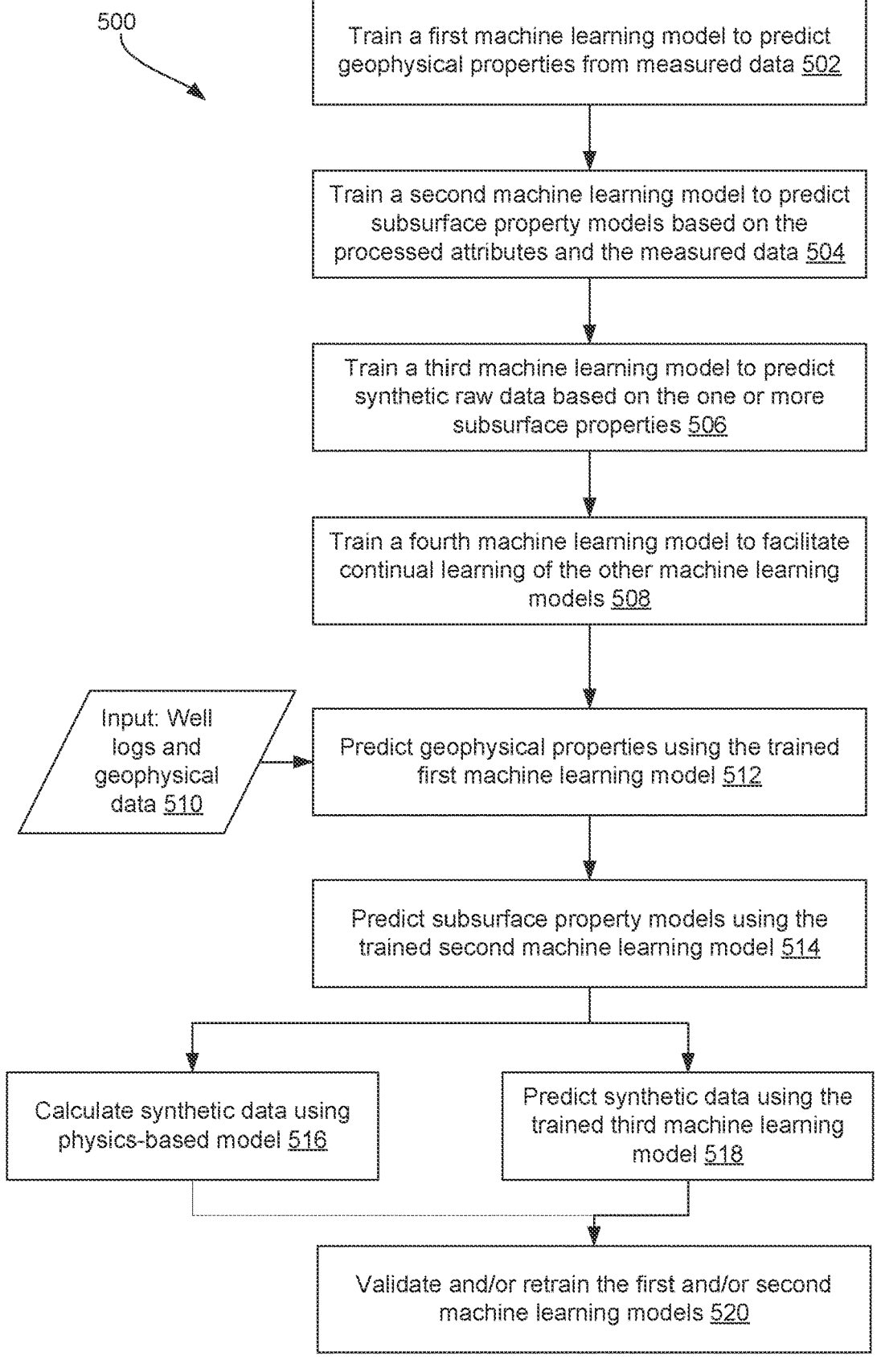
FIG. 5 illustrates a flowchart of a method for automatically building and validating geophysical models from measurement data, according to an embodiment.

FIG. 5 illustrates a flowchart of a method 500 that may be executed by operation of the system 400 as described in FIG. 4, according to an embodiment. Reference is now made to both FIGS. 4 and 5 to describe the training and implementation of the system 400 as described in FIG. 4 using the method 500. It will be appreciated that aspects of the method 500 may be performed using other systems, may be performed in a different order than the one example presented, may be combined or separated, and/or may be performed in parallel, without departing from the scope of the present disclosure.

The method 500 may begin by training the machine learning models. For example, the method 500 may include training the first machine learning model 402 as described in FIG. 4 to predict geophysical properties based on (from) measured data, as at 502. A training corpus of pairs of ground truth inputs and outputs may be provided to the first machine learning model 402 as described in FIG. 4 for such initial training (it will be appreciated that the training process may be ongoing, as will be described below, but some initial training may be employed to begin). The ground truth inputs may be measured seismic data (gathers) and/or well logs. The ground truth outputs may be subsurface properties such as seismic properties, non-seismic properties, and/or interpretations of the ground truth inputs, which may be, for example, prepared by subject matter experts, contained in proprietary or public data libraries, calculated using other types of models, etc. Examples of non-seismic properties include resistivity and density. Examples of seismic properties include seismic attributes and/or relative geological time. Examples of interpretations include labels for faults, salt structures, stratigraphic layers, etc. Accordingly, the first machine learning model 402 as described in FIG. 4 may be trained to predict one, some, or all of these properties from input seismic and well log data.

The second machine learning model 404 as described in FIG. 4 may be trained to predict subsurface property models (e.g., volumes) based on the input seismic data, input well logs, and/or subsurface properties, e.g., the same type of properties predicted by the first machine learning model 402 as described in FIG. 4, as at 504. The second machine learning model 404 as described in FIG. 4 may thus be provided with ground truth inputs and outputs so as to train the second machine learning model 404 as described in FIG. 4 to predict subsurface property models. In order to train the second machine learning model 404 as described in FIG. 4, a deep learning technique may be used. In such a technique, a loss function may be customized for constraining the training process by the input properties. This may balance various loss functions during the refinement process.

The third machine learning model 406 as described in FIG. 4 may be trained to predict "synthetic" raw data based on the subsurface property models predicted by the second machine learning model 404 as described in FIG. 4, as at 506. That is, the third machine learning model 406 as described in FIG. 4 may be trained to validate the first and second machine learning models 402, 404 as described in FIG. 4, by generally operating in reverse thereto. Thus, pairs of subsurface property models (e.g., volumes), such as those predicted by the second machine learning model 404 as described in FIG. 4, and raw (e.g., measured) seismic data that corresponds to the subsurface property models, may be fed as a ground truths to the third machine learning model 406 as described in FIG. 4. Thus, the third machine learning model 406 as described in FIG. 4 may be configured, based on a loss function, to predict the raw input data that led to the subsurface property models. This predicted raw input data is considered the "synthetic" raw data, as it is generated by the processors and not directly measured.

In a specific example, the third machine learning model 406 as described in FIG. 4 may employ a data-driven deep learning approach for training. For example, a ground truth property (e.g., P-wave velocity, S-wave velocity, and density at well locations) may be provided as input and corresponding processed field data (e.g., seismic migrated images) may be provided as output of a deep learning model. This may reverse the input and output defined in the previous property prediction stage (e.g., from the second machine learning model), and may be used to train the third machine learning model 406. The training may occur in a single pass in some embodiments.

The method 500 may also include training the fourth machine learning model 408 as described in FIG. 4 to enhance the continual learning of the first, second, and third machine learning models 402-406 as described in FIG. 4, as at 508. That is, the fourth machine learning model 408 as described in FIG. 4 may be trained to predict gradients for back propagation of the first, second, and/or third machine learning models 402-406 as described in FIG. 4. Thus, the fourth machine learning model 408 as described in FIG. 4 can represent gradients generated by other algorithms such as reinforcement learning. Gradients generated by reinforcement learning may reduce the convergence time and accelerate the overall process. Further, when the data mismatch is large, additional well data may be supplied for training the second and third machine learning models 404, 406 as described in FIG. 4 and new subsurface properties (e.g., cubes/volumes) and synthetic seismic data may be generated.

With the machine learning models 402-408 as described in FIG. 4 trained, the method 500 may proceed to an implementation stage. The system 400 as described in FIG. 4 may receive, as input at 510, measurement data such as seismic data 412 as described in FIG. 4 (recordings of seismic waves that have propagated through a subterranean volume of interest) and well logs 414 as described in FIG. 4 (e.g., depth-dependent measurements taken using sensors deployed into a well). Various processing methods and physics-based models may be employed to process the seismic data, e.g., to form seismic cubes. In some examples, a physics-based and/or machine learning models may also be employed to process the seismic data. A secondary machine learning model may be trained to process the well logs, e.g., for quality control, log correlation, and/or log interpretation.

Once processed, the seismic data and the well logs may be provided to the first machine learning model 402 as described in FIG. 4. As discussed above, the first machine learning model 402 as described in FIG. 4 may be trained to receive such data and predict geophysical properties of the subterranean volume of interest, and thus the method 500 may include such prediction using the first machine learning model 402 as described in FIG. 4, as at 512. For example, the first machine learning model 402 as described in FIG. 4 may employ the processed input data 412 and/or 414 as described in FIG. 4 to generate non-seismic data/properties 416 as described in FIG. 4, such as resistivity and density. The first machine learning model 402 as described in FIG. 4 may also generate seismic properties 418 as described in FIG. 4 such as seismic attributes (e.g., geometric properties, instantaneous velocity, anisotropy). The first machine learning model 402 as described in FIG. 4 may further the configured to generate interpretations 420 as described in FIG. 4 such as the presence, location, and shape of faults and salt bodies, as well as subsurface stratigraphy.

The geophysical properties (collectively, the non-seismic data/properties 416, seismic properties 418, and interpretation 420 as described in FIG. 4) may then, along with the input measurements 412, 414 as described in FIG. 4 be fed to the second machine learning model 404 as described in FIG. 4. At 514, the second machine learning model 404 as described in FIG. 4 may predict subsurface properties, e.g., three-dimensional property models (e.g., volumes, cubes, etc.), such as density 422 as described in FIG. 4, P-wave velocity 424 as described in FIG. 4, and/or other properties 426 as described in FIG. 4, such as sonic velocity, acoustic impedance, porosity, saturation, and the like.

The subsurface property models (e.g., 422, 424, 426 as described in FIG. 4) may then be provided to the physics-based model 410 as described in FIG. 4 and the third machine learning model 406 as described in FIG. 4, e.g., alternatively or in parallel, for purposes of validation, e.g., confirming that the generated property volumes 422-426 as described in FIG. 4 are accurate within acceptable tolerances. For example, a majority of the property models may be provided to the third machine learning model 406 as described in FIG. 4, with the physics-based model 410 as described in FIG. 4 being used relatively infrequently, e.g., to check the output of the third machine learning model 406 as described in FIG. 4. Accordingly, the physics-based model 410 as described in FIG. 4 and the third machine learning model 406 as described in FIG. 4 may both be configured to generate "synthetic" measurement data 428, 430, respectively, as described in FIG. 4 based on the subsurface property models 422-426 as described in FIG. 4. That is, the physics-based model 410 as described in FIG. 4 and the third machine learning model 406 as described in FIG. 4 may be configured to provide the seismic or well log data may be expected to generate the property volumes 422-426 as described in FIG. 4 that were predicted by the second machine learning model 404 as described in FIG. 4.

The physics-based model 410 as described in FIG. 4 may employ a physics-based, deterministic approach in order to calculate synthetic input data from the input subsurface property model(s), as at 516. The physics-based model 410 as described in FIG. 4 may utilize forward modeling engines that approximate the physics process. The output may be synthetic raw data (e.g., a seismic gather, electromagnetic field, etc.), e.g., corresponding to the input 412 as described in FIG. 4. For example, the predicted property (e.g., P-wave velocity, S-wave velocity, and density) may be received as input to the physics-based model 410 as described in FIG. 4. The predicted property can be in the form of 3D cubes, 2D sections, and/or 1D traces, depending on the data used when predicting the properties. A physics-based forward modeling engine may then be selected (e.g., finite difference modeling based on elastic wave equation to generate seismic data from P-wave velocity, S-wave velocity, and density, integral equation/finite difference modeling based on Maxwell equation to generate CVSEM/MT data from resistivity). Next, the modeling parameters may be set based on the data acquisition scheme used when acquiring the field data. The forward modeling engine may then be run. The output is synthetic raw data, analogous (e.g., of the same type, resolution, etc.) to the data acquired from field, so as to permit a comparison therebetween. As updates to the property model received as input are received, so as to keep the output from the physics-based model accurate, the forward based modeling may be run again so as to recalculate the synthetic raw data and again compare the real and synthetic data to determine the misfit.

The third machine learning model 406 as described in FIG. 4 may also generate or "predict" synthetic data (e.g., migrated seismic images), as at 518. The third machine learning model 406 as described in FIG. 4 may serve as a simulator that takes the predicted properties from the previous stage as input and produces the corresponding synthetic processed data.

The synthetic data, produced by either or both of the physics-based model 410 and/or the third machine learning model 406 as described in FIG. 4, may be used to validate and/or (re)train the first and/or second machine learning models 402, 404 as described in FIG. 4, as at 520. For example, the misfit between the synthetic processed data and the true processed data from field may be calculated, and may be used to retrain the first and/or second machine learning models 402, 404 as described in FIG. 4, as will be described in greater detail below. If updated versions of predicted properties become available, the implementation stage (but not the training stage) may be repeated.

Simulation of the physics-based model 410 as described in FIG. 4 may be computationally expensive relative to data-driven approach employed by the third machine learning model 406 as described in FIG. 4, as the physics-based model 410 as described in FIG. 4 may be reconfigured when additional data related to the subsurface properties is generated; however, the physics-based model 410 as described in FIG. 4 is employed because it "injects" physics into the system 400. That is, the physics-based model 410 as described in FIG. 4 may ensure that solutions generated by the machine learning models 402, 404, 406 as described in FIG. 4 are realistic, and consistent with known physical limits.

Figure 6:
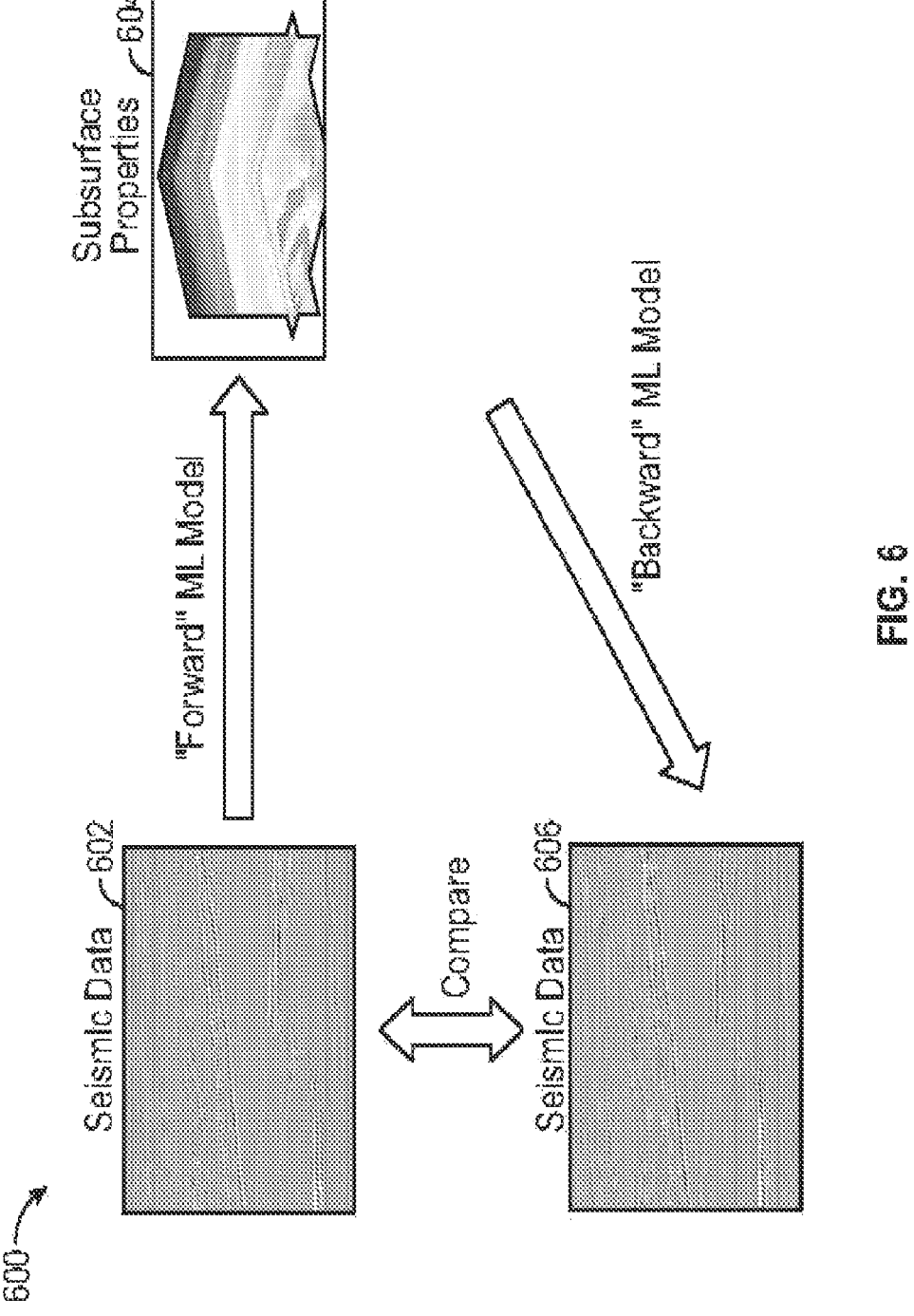
FIG. 6 illustrates a use-case for a "backward" propagating machine learning model and/or physics-based model, according to an embodiment.

Referring now to FIG. 6, there is shown a diagram 600 of the use-case for the third machine learning model 406 (and/or the physics-based model 410). In particular, seismic data 602 is received and is used (e.g., by the first and second machine learning models 402, 404) to generate subsurface properties 604 available at sparse locations (e.g., wells). The third machine learning model 406 and/or the physics-based model 410 can then "backward" model synthetic seismic data 606 from the subsurface properties 604. Comparison of the input seismic data 602 and the synthetic seismic data 606 may reveal a misfit in the predicted subsurface properties, as it may be assumed that a better prediction of the subsurface properties from the seismic data 604 may yield a better prediction of the synthetic data 606 (i.e., closer to the original input seismic data 602).

Referring again to FIG. 4, thus, by reversing the input and output of the deep learning model in the second machine learning model 404 as described in FIG. 4, a new deep learning model can be generated that predicts synthetic processed data for comparison with the processed field data. Thus, the generated synthetic data can be compared. The synthetic data that is generated may be compared with the "real" (measured) data that was received as input 412 as described in FIG. 4. As shown, this may apply to the seismic data 412 as described in FIG. 4, but it may also be employed to compare well log data 414 as described in FIG. 4. If the comparison yields acceptable results, e.g., accurate within a tolerance, the three-dimensional property volumes 420-426 as described in FIG. 4 may be validated, and passed for use in further tasks such as subsurface modeling, seismic, geological, and/or reservoir engineering, production forecasting, well placement/planning, etc., as at block 432 as described in FIG. 4.

In an embodiment, the backward ML model for property prediction is a convolutional neural network (CNN) that is trained using the 1D properties computed from well logs as input, and the 1D single trace poststack seismic data at well locations as the target, as an example. However, a relatively small training set is available for such 1D networks, because the number of wells in a given seismic survey may be relatively few (e.g., less than 100). Thus, self-supervised learning (SSL) may be employed to improve model generalization. The 1D network may also be extended to 2D, which may provide access to richer information from multiple traces.

The self-supervised seismic reconstruction may be used to validate the ML-based seismic property prediction result obtained on a survey. Thus, in the backward ML model, SSL may be used to improve model generalization. For example, when a sufficient amount of labeled data is not available, SSL may be employed to obtain a general feature extractor by learning on largescale unlabeled data, which will be used later in a supervised learning (SL) task.

The SSL model may be trained using the labels. Specifically, noise may be synthetically injected into the original seismic data, then a convolutional autoencoder as the SSL model may be trained to reconstruct the original seismic data. The training samples may be 2D seismic patches randomly extracted from the seismic volume. After convergence, the decoder from the SSL model may be preserved for further use in the subsequent SL model.

A subsequent supervised learning (SL) model that shares the same decoder from the SSL model may then be trained. The SL model takes ground truth property at well locations as input, and the corresponding seismic traces as labels. The SL model may use the frozen decoder from the SSL model, but may have a deeper encoder and bottleneck blocks that are trained from scratch. By pretraining the decoder in the SSL model, the SL model may realize an improved probability of extracting at least some (e.g., the most relevant) features from the input data for a given task.

In the property prediction task, in particular, the prediction may resemble the ground truth when it is sufficiently close to the training wells. To overcome the challenge of having one ground truth property trace per SL training location, the predicted property in the proximity of the training wells may be used as a "pseudo-ground truth". The correlation coefficient between the original and reconstructed seismic data at overlapping windows around individual samples in the seismic volume may then be computed. The output for the produced volume may provide a "correlation heatmap," which shows the quality of seismic reconstruction over the seismic volume. This correlation heatmap may then be used to infer the quality of ML-predicted property, e.g., with higher correlations generally pointing to more accurately predicted properties.

Referring again to FIG. 4, as noted above, the system 400 may also implement feedback loops 440, 442, as described in FIG. 4, of which the fourth machine learning model 408 as described in FIG. 4 may be a part, in order to train the machine learning models 402, 404, 406 as described in FIG. 4. The machine learning models 402-406 as described in FIG. 4 may be (re)trained in either or both loops 440, 442 as described in FIG. 4, e.g., with different loss functions. In other embodiments, the machine learning models 402-404 may be trained alternately between the two loops 440, 442 as described in FIG. 4. The first machine learning model 402 as described in FIG. 4 may be trained using processed seismic data as a ground truth input and interpreter (e.g., manually entered) labels as ground truth output. To train the second machine learning model 404 as described in FIG. 4, processed seismic data and the output of the third machine learning model 406 as described in FIG. 4 may be used as ground truth input, and well log measurements as ground truth output. A weight mask can be used in both training processes to adjust the uncertainty level of training data as well as prediction data. For example, during training of the third machine learning model 406 as described in FIG. 4, well measurement location can be assigned a relatively high level of certainty (e.g., 100%) and other locations can be assigned a relatively low level of certainty (e.g., 0%).

Alternate training of the machine learning models 402-406 as described in FIG. 4 may be conducted in two stages. First, the machine learning models 402-406 as described in FIG. 4 may be considered as a single forward network, but the weight of the first and second machine learning models 402, 404 as described in FIG. 4 may be held constant, permitting the weight of the third machine learning model 406 as described in FIG. 4 to be adjusted. At next stage, the weight of the third machine learning model 406 as described in FIG. 4 may be held constant and the weights of the first and second machine learning models 402, 404 as described in FIG. 4 may be adjusted for training.

In a specific embodiment, the first feedback loop 440 as described in FIG. 4 may proceed from processed seismic data to subsurface property to seismic data, providing feedback for training the second machine learning model 404 as described in FIG. 4. The first feedback loop 440 as described in FIG. 4 takes input of processed seismic and passes it through the second machine learning model 404 as described in FIG. 4 to obtain well properties, which are in turn fed into the third machine learning model 406 as described in FIG. 4 to obtain processed seismic data. A loss function may thus be generated, which may be a reconstruction error of output seismic versus input seismic, plus a property reconstruction error. In some embodiments, a weight masking can be provided, which may weight well property results closer to well locations (from which well logs are received) as having higher certainty than locations that are farther away from the well locations (e.g., 100% or nearly so at the well locations). For reconstruction error of seismic data, a constant certainty can be applied in the full image (e.g., 100%), in order to enhance the reconstruction consistency. In other embodiments, certainty for the seismic reconstruction may be set at 100% certainty at well locations, gradually decreasing as proceeding away from well location.

The second feedback loop 442 as described in FIG. 4 may use a well property as input and pass it through the third machine learning model 406 as described in FIG. 4 to obtain processed seismic data. The processed seismic data may be fed to the first and/or second machine learning models 402, 404 as described in FIG. 4 to obtain the well property. A loss function may be calculated based on a reconstruction error of well property between the input and the processed, with a higher (e.g., 100%) certainty at well locations and a lower (e.g., 0%) certainty at other locations. In addition, the seismic reconstruction error may be applied as a high (e.g., 100%) certainty weight mask throughout the volume. In at least some embodiments, either or both of the first and second feedback loops 440, 442 as described in FIG. 4 may provide input for training the first and/or second machine learning models 402, 404 as described in FIG. 4.

Further, the feedback loop 442 as described in FIG. 4 may employ the fourth machine learning model 408 as described in FIG. 4, e.g., via reinforcement learning and/or active learning. For example, a gradient may be directly generated by back propagation of the first, second, and/or third machine learning models 402-406 as described in FIG. 4. The fourth machine learning model 408 as described in FIG. 4 may thus represent gradients generated by other techniques such as reinforcement learning. Gradients generated by reinforcement learning may reduce the converging time and accelerate the overall process. In some other embodiments, the first feedback loop 440 as described in FIG. 4 may also include a machine learning model, e.g., the fourth machine learning model 408 as described in FIG. 4.

As another example, in reinforcement learning, when the data mismatch is "large" additional training well inputs may be called for, and then second and third machine learning models 404, 406 as described in FIG. 4 may be retrained, such that new 3D property models and synthetic seismic data are obtained. From the predicted 3D properties and associated confidence cubes, uncertainty maps (choosing high confidence and small uncertainty) may be used to generate synthetic or "pseudo" wells. Then the second and third machine learning models 404, 406 may be retrained and new 3D property models and synthetic seismic data obtained.

In some embodiments, the system 400 as described in FIG. 4 and method 500 as described in FIG. 5 can be used for wind farm site characterization. Offshore wind farms involve a large number of machines (tens to hundreds of units) as well as a wide surface area (tens to hundreds of km$^2$). The ground stratigraphy, the mechanical properties of materials and their lateral and vertical variability may be accurately determined at each foundation location. Furthermore, a solid knowledge of the mechanical properties of shallow sediments is used over the cable routes, between wind turbines and to the coast. Field studies provide the information regarding soils and rocks, up to a depth that will allow detecting the presence of weak formations able to impact the stability of the structure and/or generate excessive deformations (settlements). From seismic data and CPT logs, 3D subsurface models of geotechnical properties are generated. This subsurface model is used for site characterization and monitoring. The seismic data and CPT logs are also collected over time. This Subsurface Model Building Engine may thus reduce the turnaround time to update the subsurface model as new information is received.

In some embodiments, the system 400 as described in FIG. 4 and method 500 as described in FIG. 5 can be used for carbon capture, utilization, and storage (CCUS) applications. The system 400 as described in FIG. 4 and method 500 as described in FIG. 5 may be configured to implement $CO2$ subsurface management (site characterization and monitoring, economic $CO2$ project management). The embodiments may receive 3D surface seismic, microseismic, x-well seismic and electromagnetic data, vertical seismic profiles, surface and borehole gravity, logs, etc. The embodiments may generate porosity data, $CO2$ (gas) saturation, plume movement, seal integrity, injectivity, ground movement, etc. With traditional workflows, this may be considered a "big data integration" effort, calling for many manual interactions, which may be repeated when new data becomes available. With the present systems and methods, however, certain of these aspects may be skipped or automated. Thus, updating of subsurface model over time is facilitated.

In some embodiments, the system 400 as described in FIG. 4 and method 500 as described in FIG. 5 can be used for hydrothermal site characterization. In such embodiments, multi-physics data (e.g., potential fields data such as electromagnetic and gravity data) are used to build a sub-surface model engine. The engine may then be used for time-lapse monitoring of geothermal production.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 7:
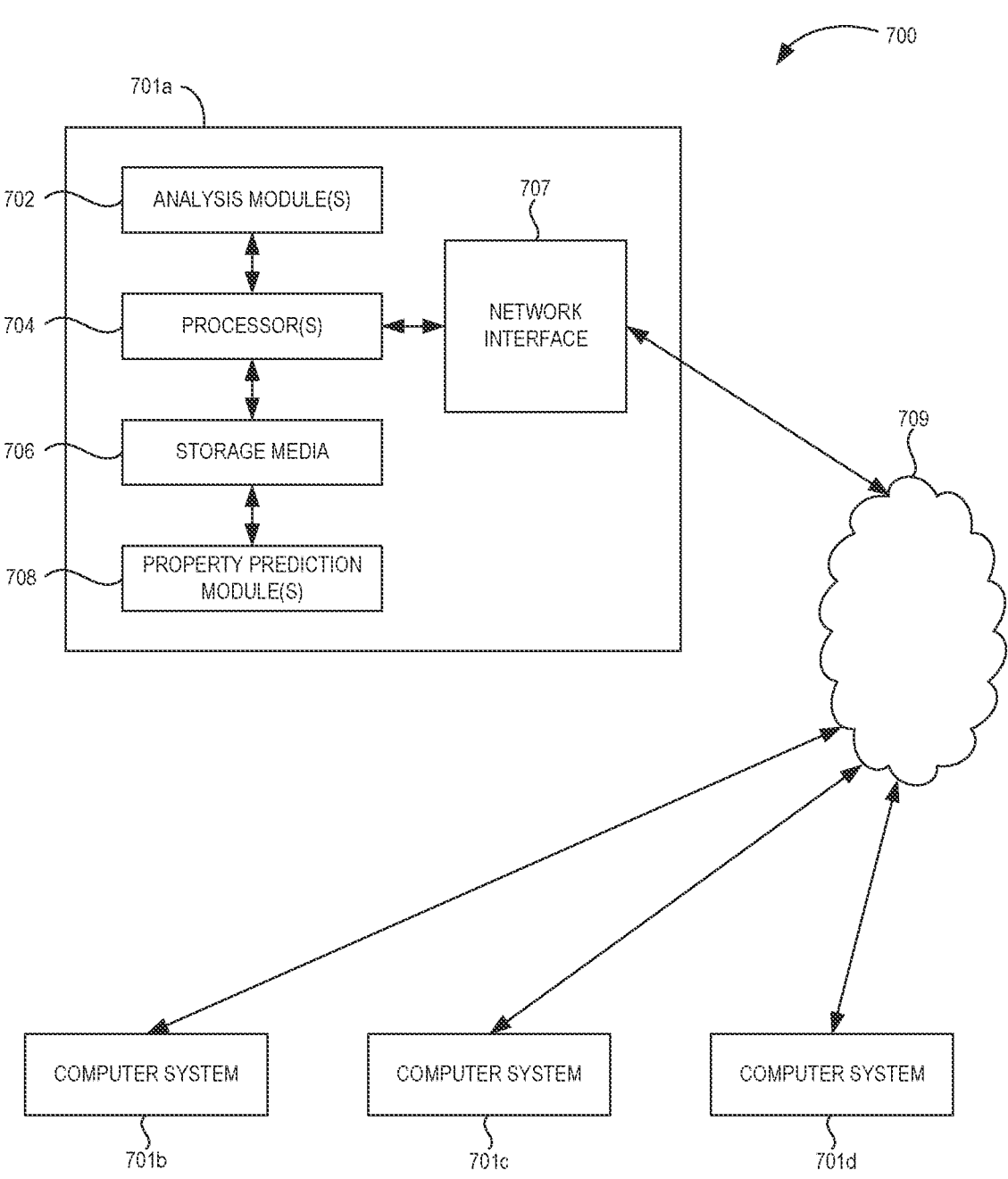
FIG. 7 illustrates a schematic view of a computing system, according to an embodiment.

In some embodiments, any of the methods of the present disclosure may be executed using a system, such as a computing system. FIG. 7 illustrates an example of such a computing system 700, in accordance with some embodiments. The computing system 700 may include a computer or computer system 701*a*, which may be an individual computer system 701*a* or an arrangement of distributed computer systems. The computer system 701*a* includes one or more analysis module(s) 702 configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701*a* to communicate over a data network 709 with one or more additional computer systems and/or computing systems, such as 701*b*, 701*c*, and/or 701*d* (note that computer systems 701*b*, 701*c* and/or 701*d* may or may not share the same architecture as computer system 701*a*, and may be located in different physical locations, e.g., computer systems 701*a* and 701*b* may be located in a processing facility, while in communication with one or more computer systems such as 701*c* and/or 701*d* that are located in one or more data centers, and/or located in varying countries on different continents).

A processor can include a microprocessor, microcontroller, processor module or subsystem, programmable integrated circuit, programmable gate array, or another control or computing device.

The storage media 706 can be implemented as one or more computer-readable or machine-readable storage media. Note that while in the example embodiment of FIG. 7 storage media 706 is depicted as within computer system 701*a*, in some embodiments, storage media 706 may be distributed within and/or across multiple internal and/or external enclosures of computing system 701*a* and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 700 contains one or more property prediction module(s) 708. In the example of computing system 700, computer system 701*a* includes the property prediction module 708. In some embodiments, a single prediction generation module may be used to perform some or all aspects of one or more embodiments of the methods. In alternate embodiments, a plurality of property prediction modules may be used to perform some or all aspects of methods.

It should be appreciated that computing system 700 is only one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for modeling a subterranean volume of interest, comprising:

receiving input measurement data representing the subterranean volume of interest;

predicting a subsurface property based at least in part on the input measurement data using a first machine learning model, wherein the first machine learning model includes a self-supervised learning model and a supervised learning model, wherein the self-supervised learning model including a self-supervised learning (SSL) encoder and a SSL decoder, and the supervised learning model includes the SSL decoder and a supervised learning (SL) encoder, and wherein predicting the subsurface property includes:

combining seismic traces with noise;

training the self-supervised learning model to reconstruct the seismic traces from the seismic traces combined with the noise, resulting in reconstructed seismic traces;

displaying the reconstructed seismic traces;

training the supervised learning model to predict one or more properties based on the reconstructed seismic traces; and predicting the subsurface property using the supervised learning model;

predicting a subsurface property model based at least in part on the subsurface property, the input measurement data, or both, using a second machine learning model;

predicting synthetic measurement data based at least in part on the subsurface property model using a third machine learning model, a physics-based model, or both;

generating a reconstruction error of the synthetic measurement data by comparing the synthetic measurement data and the input measurement data;

using the reconstruction error and the synthetic measurement data, re-training the self-supervised learning model and the supervised learning model to reconstruct the seismic traces, resulting in retrained reconstructed seismic traces; and displaying the retrained reconstructed seismic traces.

2. The method of claim 1, wherein training the first machine learning model, the second machine learning model, or both comprises generating a training gradient using a fourth machine learning model.

3. The method of claim 1, wherein the input measurement data comprises a well log, seismic data, or both.

4. The method of claim 1, further comprising processing the input measurement data prior to predicting the subsurface property based at least in part on the input measurement data.

5. The method of claim 1, wherein the subsurface property is selected from the group consisting of resistivity, density, one or more seismic attributes, relative geological time, fault location, sale body location, and stratigraphy.

6. The method of claim 1, wherein the subsurface property model comprises a three-dimensional model of the subsurface property of the subterranean volume of interest, and wherein the subsurface property is selected from the group consisting of density, sonic wave velocity, acoustic impedance, porosity, and saturation.

7. The method of claim 1, wherein training the first machine learning model comprises holding the second machine learning model constant while adjusting the first machine learning model based on a comparison between the synthetic measurement data and the input measurement data.

8. A system, comprising:

one or more processors; and a memory system storing instructions that, when executed by at least one of the one or more processors, cause the system to perform operations, the operations comprising:

receiving input measurement data representing a subterranean volume of interest;

predicting a subsurface property based at least in part on the input measurement data using a first machine learning model, wherein the first machine learning model includes a self-supervised learning model and a supervised learning model, wherein the self-supervised learning model including a self-supervised learning (SSL) encoder and a SSL decoder, and the supervised learning model includes the SSL decoder and a supervised learning (SL) encoder, and wherein predicting the subsurface property includes:

combining seismic traces with noise;

training the self-supervised learning model to reconstruct the seismic traces from the seismic traces combined with the noise, resulting in reconstructed seismic traces;

displaying the reconstructed seismic traces;

training the supervised learning model to predict one or more properties based on the reconstructed seismic traces; and predicting the subsurface property using the supervised learning model;

predicting a subsurface property model based at least in part on the subsurface property, the input measurement data, or both, using a second machine learning model;

predicting synthetic measurement data based at least in part on the subsurface property model using a third machine learning model, a physics-based model, or both;

generating a reconstruction error of the synthetic measurement data by comparing the synthetic measurement data and the input measurement data;

using the reconstruction error and the synthetic measurement data, re-training the self-supervised learning model and the supervised learning model to reconstruct the seismic traces, resulting in retrained reconstructed seismic traces; and displaying the retrained reconstructed seismic traces.

9. The system of claim 8, wherein training the first machine learning model, the second machine learning model, or both comprises generating a training gradient using a fourth machine learning model.

10. The system of claim 8, wherein the input measurement data comprises a well log, seismic data, or both.

11. The system of claim 8, wherein the operations further comprise processing the input measurement data prior to predicting the subsurface property based at least in part on the input measurement data.

12. The system of claim 8, wherein the subsurface property is selected from the group consisting of resistivity, density, one or more seismic attributes, relative geological time, fault location, sale body location, and stratigraphy.

13. The system of claim 8, wherein the subsurface property model comprises a three-dimensional model of the subsurface property of the subterranean volume of interest, and wherein the subsurface property is selected from the group consisting of density, sonic wave velocity, acoustic impedance, porosity, and saturation.

14. The system of claim 8, wherein training the second machine learning model comprises holding the first machine learning model constant while adjusting the second machine learning model based on a comparison between the synthetic measurement data and the input measurement data.

15. A non-transitory computer-readable medium storing instructions that, when executed by at least one processor of a computing system, cause the computing system to perform operations, the operations comprising:

receiving input measurement data representing a subterranean volume of interest;

predicting a subsurface property based at least in part on the input measurement data using a first machine learning model, wherein the first machine learning model includes a self-supervised learning model and a supervised learning model, wherein the self-supervised learning model including a self-supervised learning (SSL) encoder and a SSL decoder, and the supervised learning model includes the SSL decoder and a supervised learning (SL) encoder, and wherein predicting the subsurface property includes:

combining seismic traces with noise;

training the self-supervised learning model to reconstruct the seismic traces from the seismic traces combined with the noise, resulting in reconstructed seismic traces;

displaying the reconstructed seismic traces;

training the supervised learning model to predict one or more properties based on the reconstructed seismic traces; and predicting the subsurface property using the supervised learning model;

predicting a subsurface property model based at least in part on the subsurface property, the input measurement data, or both, using a second machine learning model;

predicting synthetic measurement data based at least in part on the subsurface property model using a third machine learning model, a physics-based model, or both;

generating a reconstruction error of the synthetic measurement data by comparing the synthetic measurement data and the input measurement data;

using the reconstruction error and the synthetic measurement data, re-training the self-supervised learning model and the supervised learning model to reconstruct the seismic traces, resulting in retrained reconstructed seismic traces; and displaying the retrained reconstructed seismic traces.

16. The medium of claim 15, wherein training the first machine learning model, the second machine learning model, or both comprises generating a training gradient using a fourth machine learning model.

17. The medium of claim 15, wherein the operations further comprise processing the input measurement data prior to predicting the subsurface property based at least in part on the input measurement data.

18. The medium of claim 15, wherein the subsurface property model comprises a three-dimensional model of the subsurface property of the subterranean volume of interest, and wherein the subsurface property is selected from the group consisting of density, sonic wave velocity, acoustic impedance, porosity, and saturation.

* * * * *